United States Patent
Sato (10) Patent No.: US 8,289,743 B2
(45) Date of Patent: Oct. 16, 2012

(54) SYSTEMS AND METHODS FOR DIRECT-CURRENT VOLTAGE CONTROL

(75) Inventor: Tomohisa Sato, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 490 days.

(21) Appl. No.: 12/449,172

(22) PCT Filed: Feb. 14, 2008

(86) PCT No.: PCT/JP2008/052445
§ 371 (c)(1), (2), (4) Date: Jul. 27, 2009

(87) PCT Pub. No.: WO2008/099884
PCT Pub. Date: Aug. 21, 2008

(65) Prior Publication Data
US 2010/0014323 A1 Jan. 21, 2010

(30) Foreign Application Priority Data
Feb. 16, 2007 (JP) ................. 2007-037008

(51) Int. Cl.
H02M 7/48 (2007.01)
H02M 3/335 (2006.01)
H02M 5/45 (2006.01)
H02M 5/458 (2006.01)
(52) U.S. Cl. ............... 363/71; 363/17; 363/37
(58) Field of Classification Search ............ 363/17, 363/34, 37, 65, 71
See application file for complete search history.

(56) References Cited

U.S. PATENT DOCUMENTS

| 5,289,361 A | | 2/1994 | Vinciarelli | |
|---|---|---|---|---|
| 5,576,940 A | * | 11/1996 | Steigerwald et al. | 363/17 |
| 5,771,163 A | * | 6/1998 | Moriguchi et al. | 363/71 |
| 5,821,729 A | | 10/1998 | Schmidt et al. | |

(Continued)

FOREIGN PATENT DOCUMENTS

AT    412 693    5/2005

(Continued)

OTHER PUBLICATIONS

International Search Report dated May 13, 2008, issued on PCT/JP2008/052445.

(Continued)

*Primary Examiner* — Adolf Berhane
*Assistant Examiner* — Gary Nash
(74) *Attorney, Agent, or Firm* — S. Peter Konzel (57) ABSTRACT

A voltage control device and a voltage control method capable of improving efficiency of a system as a whole even when fluctuation in voltage of a capacitor, which is a storage battery, is large are provided. A capacitor for supplying electric power to a predetermined load, an inverter connected to the load, an AC-coupling bi-directional DC-DC converter including two voltage source inverters of which direct-current terminals are connected in series so as to have additive polarity and a transformer for AC-coupling alternating-current terminals of the two voltage source inverters and having a predetermined leak inductance, with one of the two voltage source inverters connected in parallel to a capacitor, for outputting direct-current voltage obtained by increasing capacitor voltage of the capacitor to the inverter, and control unit for generating a command value of the direct-current voltage based on efficiency of the AC-coupling bi-directional DC-DC converter having a value corresponding to the capacitor voltage to output, are provided.

9 Claims, 10 Drawing Sheets

U.S. PATENT DOCUMENTS

| | | | |
|---|---|---|---|
| 5,883,484 A | 3/1999 | Akao | |
| 6,388,904 B2 * | 5/2002 | Nomura | 363/71 |
| 6,574,125 B2 | 6/2003 | Matsukawa et al. | |
| 6,982,499 B1 | 1/2006 | Kachi et al. | |
| 7,054,175 B2 * | 5/2006 | Kurio et al. | 363/65 |
| 7,742,305 B2 | 6/2010 | Schweigert et al. | |
| 7,869,233 B2 | 1/2011 | Okamura et al. | |
| 2002/0074985 A1 | 6/2002 | Matsui et al. | |
| 2003/0222502 A1 | 12/2003 | Takahashi et al. | |
| 2004/0119432 A1 * | 6/2004 | Youm | 318/375 |
| 2004/0145338 A1 | 7/2004 | Nakamura et al. | |
| 2005/0190517 A1 | 9/2005 | Schweigert et al. | |
| 2007/0216323 A1 | 9/2007 | Ishikawa et al. | |
| 2009/0171521 A1 | 7/2009 | Moki et al. | |

FOREIGN PATENT DOCUMENTS

| | | |
|---|---|---|
| DE | 44 22 409 | 1/1996 |
| DE | 100 53 169 | 6/2001 |
| DE | 11 2006 003 143 | 10/2008 |
| JP | 64-008866 | 1/1989 |
| JP | 06-217553 A | 8/1994 |
| JP | 3746334 | 3/1998 |
| JP | 11-262256 A | 9/1999 |
| JP | 2001-145337 A | 5/2001 |
| JP | 2001-275367 A | 10/2001 |
| JP | 2002-135986 A | 5/2002 |
| JP | 2002-171606 A | 6/2002 |
| JP | 2002-281748 A | 9/2002 |
| JP | 2004-056995 A | 2/2004 |
| JP | 2004-326497 A | 11/2004 |
| JP | 2005-051895 A | 2/2005 |
| JP | 2005-168140 A | 6/2005 |
| JP | 2005-341698 A | 12/2005 |
| WO | WO-03/056694 A1 | 7/2003 |

OTHER PUBLICATIONS

Office Action for German Patent Application No. 11 2008 000 422.6 dated Dec. 22, 2011.

* cited by examiner

SYSTEMS AND METHODS FOR DIRECT-CURRENT VOLTAGE CONTROL

TECHNICAL FIELD

The present invention relates to a voltage control device and a voltage control method for controlling direct-current voltage obtained by converting voltage of a capacitor, which is a storage battery.

BACKGROUND ART

A hybrid vehicle equipped with an engine and a motor as drive sources is provided with the storage battery such as a battery for supplying power to the motor and for storing electric power generated by the motor. In the hybrid vehicle having such a configuration, it is general to perform voltage control of the motor focusing on efficiency of an inverter for driving the motor (refer to the patent documents 1 to 6, for example).

Patent Document 1: Japanese Patent No. 3746334 Publication
Patent Document 2: Japanese Laid-Open Patent Application No. 2001-275367 Publication
Patent Document 3: International Publication No. 03/056694 pamphlet
Patent Document 4: Japanese Laid-Open Patent Application No. 2005-341698 Publication
Patent Document 5: Japanese Laid-Open Patent Application No. 2005-168140 Publication
Patent Document 6: Japanese Laid-Open Patent Application No. 2002-171606 Publication

DISCLOSURE OF INVENTION

Problems to be Solved by the Invention

However, in a case of applying a high-capacitance capacitor such as an electric double layer capacitor as the storage battery, there has been a case in which the voltage of the capacitor largely varies by stored energy. In one example, it is known that a load at operation is large and a fluctuation range of the capacitor voltage becomes large when the hybrid vehicle is a construction machine further provided with a motor for pivoting. In such a case, efficiency of a system as a whole could not be improved in the conventional technology for performing voltage control focusing on efficiency of an inverter.

The present invention is made under the above-described circumstance and an object thereof is to provide the voltage control device and the voltage control method capable of improving the efficiency of the system as a whole even when the fluctuation of the voltage of the capacitor, which is the storage battery, is large.

Means for Solving the Problem

According to an aspect of the present invention, a voltage control device includes: a capacitor for supplying electric power to a predetermined load; an inverter connected to the load; an AC-coupling bi-directional DC-DC converter including two voltage source inverters of which direct-current terminals are connected in series to each other so as to have additive polarity and a transformer for AC-coupling alternating-current terminals of the two voltage source inverters and having a predetermined leak inductance, with one of the two voltage source inverters connected in parallel to the capacitor, for outputting direct-current voltage obtained by increasing capacitor voltage of the capacitor to the inverter; and a control unit for generating a command value of the direct-current voltage based on efficiency of the AC-coupling bi-directional DC-DC converter having a value corresponding to the capacitor voltage to output.

Advantageously, in the voltage control device, the control unit sets the command value of the direct-current voltage constant without depending on the capacitor voltage when the capacitor voltage takes a value within a predetermined range, and sets the command value of the direct-current voltage to a value with which the efficiency of the AC-coupling bi-directional DC-DC converter is better than that with the constant value when the capacitor voltage takes a value outside the range.

Advantageously, in the voltage control device, the control unit changes the command value of the direct-current voltage within a predetermined range according to the capacitor voltage.

Advantageously, in the voltage control device, the control unit uses a candidate value determined so as to correspond to an internal temperature of the AC-coupling bi-directional DC-DC converter when generating the command value of the direct-current voltage.

Advantageously, in the voltage control device, the voltage source inverter has a plurality of switching devices, and the internal temperature of the AC-coupling bi-directional DC-DC converter is a temperature of any of the plurality of switching devices and/or a temperature of the transformer.

Advantageously, in the voltage control device, the control unit sets the command value of the direct-current voltage in an unloaded state to voltage in proportion to the capacitor voltage.

Advantageously, in the voltage control device, the load is a motor.

According to another aspect of the present invention, a voltage control method of a system provided with a capacitor for supplying electric power to a predetermined load; an inverter connected to the load; and an AC-coupling bi-directional DC-DC converter including two voltage source inverters of which direct-current terminals are connected in series to each other so as to have additive polarity and a transformer for AC-coupling alternating-current terminals of the two voltage source inverters and having a predetermined leak inductance, with one of the two voltage source inverters connected in parallel to the capacitor, for outputting direct-current voltage obtained by increasing capacitor voltage of the capacitor to the inverter, includes generating a command value of the direct-current voltage based on efficiency of the AC-coupling bi-directional DC-DC converter having a value corresponding to the capacitor voltage to output.

Advantageously, the voltage control method further includes: setting the command value of the direct-current voltage constant without depending on the capacitor voltage when the capacitor voltage takes a value within a predetermined range, and setting the command value of the direct-current voltage to a value with which the efficiency of the AC-coupling bi-directional DC-DC converter is better than that with the constant value when the capacitor voltage takes a value outside the range.

Advantageously, the voltage control method further includes changing the command value of the direct-current voltage within a predetermined range according to the capacitor voltage.

Advantageously, the voltage control method further includes using candidate value determined so as to correspond to an internal temperature of the AC-coupling bi-directional DC-DC converter when generating the command value of the direct-current voltage.

Effect of the Invention

According to the present invention, the AC-coupling bi-directional DC-DC converter for increasing the capacitor voltage to output to the inverter is provided between the capacitor, which is the storage battery, and the inverter, and the control to determine the direct-current voltage based on the efficiency of the AC-coupling bi-directional DC-DC converter changing according to the capacitor voltage is performed, so that it is possible to determine the output voltage such that the efficiency of the AC-coupling bi-directional DC-DC converter is the best according to the capacitor voltage even when the high-capacitance capacitor is used as the storage battery on a load side. Therefore, even when the load connected to the inverter is large and the fluctuation in the capacitor voltage is large, the efficiency of the system as a whole may be improved.

EXPLANATIONS OF LETTERS OR NUMERALS 1 voltage control device
2 SR motor
3 engine
4 PM motor
5 capacitor
6 SR driver
7 SR condenser
8 voltage converter
9 contactor
10 excitation power source
11 diode
12 relay
13 PM inverter
14 PM condenser
15, 16 current sensor
17, 18, 19, 89, 90 voltmeter
20 insulation sensor
21 controller
22 vehicle body control unit
23 SR motor control unit
24 PM motor control unit
25 voltage converter control unit
26 contactor control unit
81 AC-coupling bi-directional DC-DC converter
82 lower inverter
83 upper inverter
84 transformer
84a, 84b coil
85, 86 condenser
87 IGBT temperature sensor
88 transformer temperature sensor
100 hydraulic shovel
101a self-propelling unit
101b pivot unit
221 power management unit
222 pivot operation unit
821a, 821b, 821c, 821d, 831a, 831b, 831c, 831d IGBT
822a, 822b, 822c, 822d, 832a, 832b, 832c, 832d diode
Lv operation lever

BEST MODE(S) FOR CARRYING OUT THE INVENTION

Hereinafter, a best mode for carrying out the present invention (hereinafter, referred to as an "embodiment") is described with reference to attached drawings.

Figure 1:
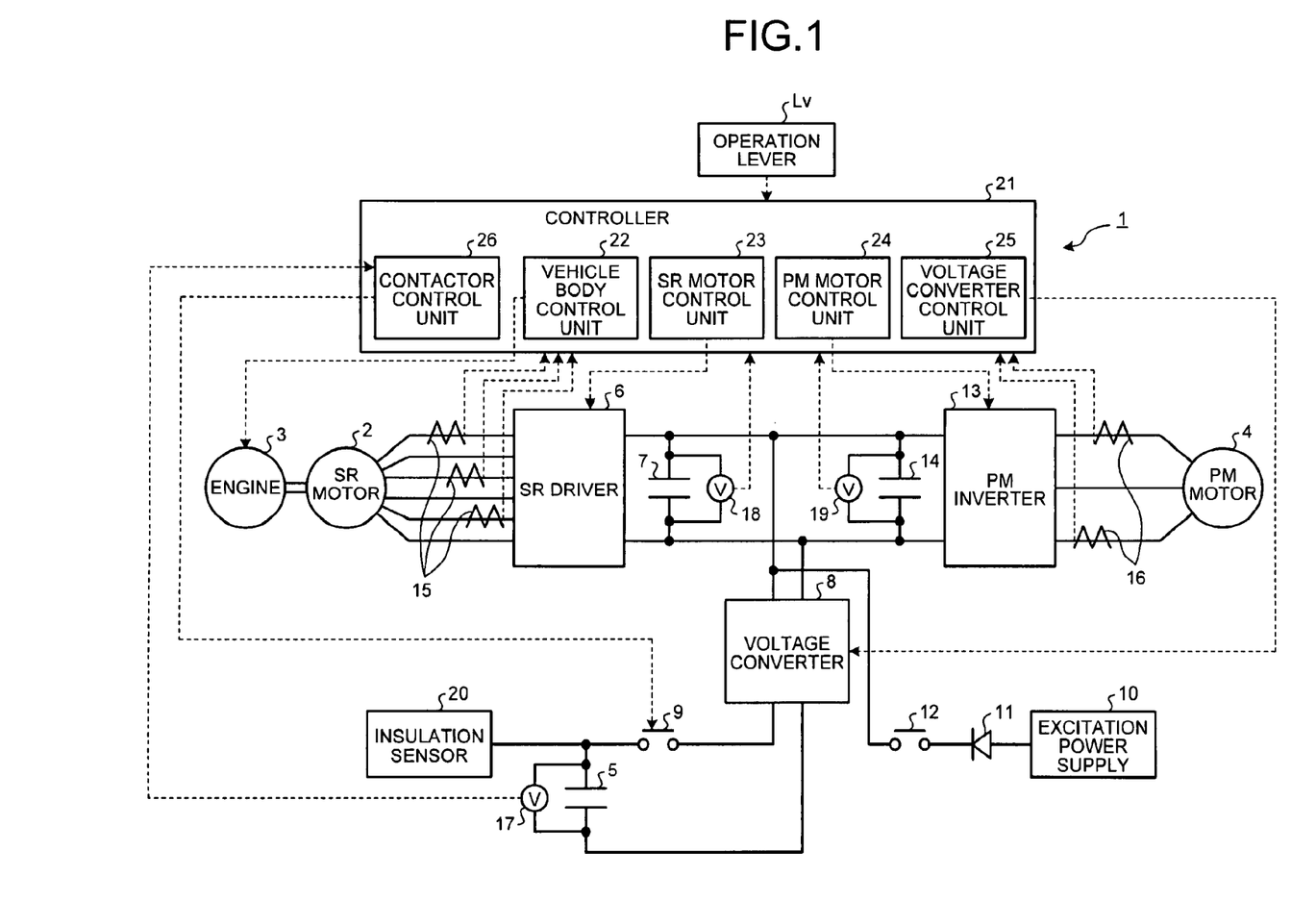
FIG. 1 is a view showing a configuration of a voltage control device according to an embodiment of the present invention.
Figure 2:
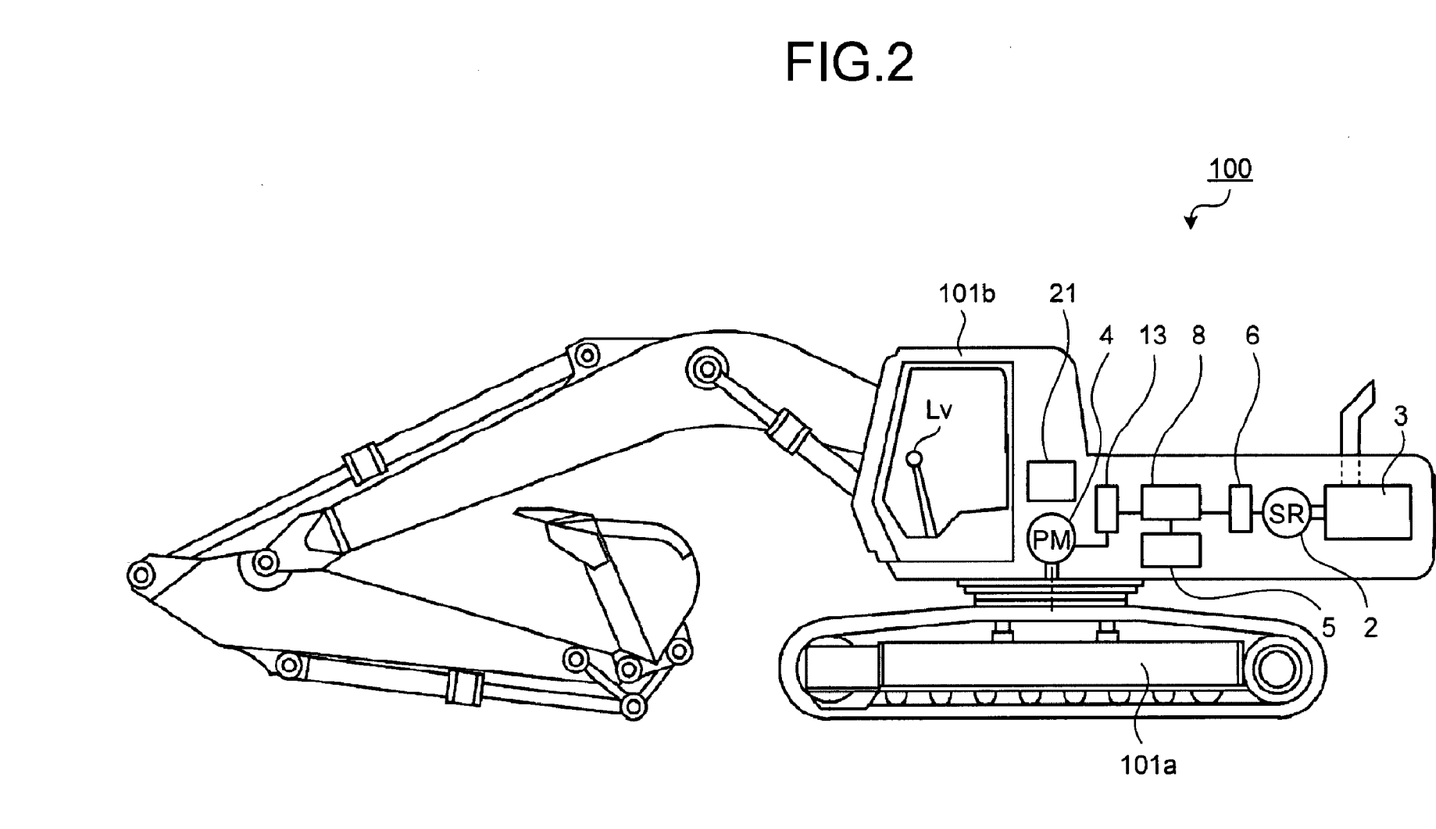
FIG. 2 is a view showing a configuration of a hydraulic shovel to which the voltage control device according to an embodiment of the present invention is applied.

FIG. 1 is a view showing a configuration of a voltage control device according to an embodiment of the present invention. A voltage control device 1 shown in the drawing composes a power system mounted on a hybrid-type vehicle. In this embodiment, the hybrid-type vehicle equipped with the voltage control device 1 is a hydraulic shovel 100 shown in FIG. 2. The hydraulic shovel 100 has a self-propelling unit 101a for self-propelling by rotation of a crawler track or the like, operating machines such as a bucket, a boom and an arm, and an operating room, and is provided with a pivot unit 101b pivotable about a pivot axis oriented to a predetermined direction relative to the self-propelling unit 101a. The voltage control device 1 mounted on the hydraulic shovel 100 having such configuration is provided with an electric generator of which drive shaft is coupled to a drive shaft of an engine, and is provided with a motor for pivoting having a drive shaft conforming to the pivot axis of the pivot unit 101b.

Hereinafter, a detailed configuration of the voltage control device 1 is described. The voltage control device 1 is provided with a three-phase excitation SR (Switched Reluctance) motor 2 having four rotor poles and six stator poles as the electric generator. A drive shaft of the SR motor 2 is coupled to a drive shaft of an engine 3. In addition, the voltage control device 1 is provided with a PM (Permanent Magnet) motor 4 as a motor for pivoting. A rotation sensor for detecting a rotational number is provided on each of the SR motor 2 and the PM motor 4 (not shown).

The SR motor 2 and the PM motor 4 are supplied with power from a high-capacitance capacitor 5 composed of an electric double layer capacitor. The capacitor 5 also has function to store electric power generated by the SR motor 2 and the PM motor 4.

The SR motor 2 is connected to an SR driver 6, which is an inverter for the SR motor. The SR driver 6 is connected in parallel to an SR condenser 7 composed of a film condenser suitable for waveform shaping and surge absorption. A voltage converter 8 for increasing voltage of the capacitor 5 to output is connected in parallel to the SR condenser 7.

Figure 3:
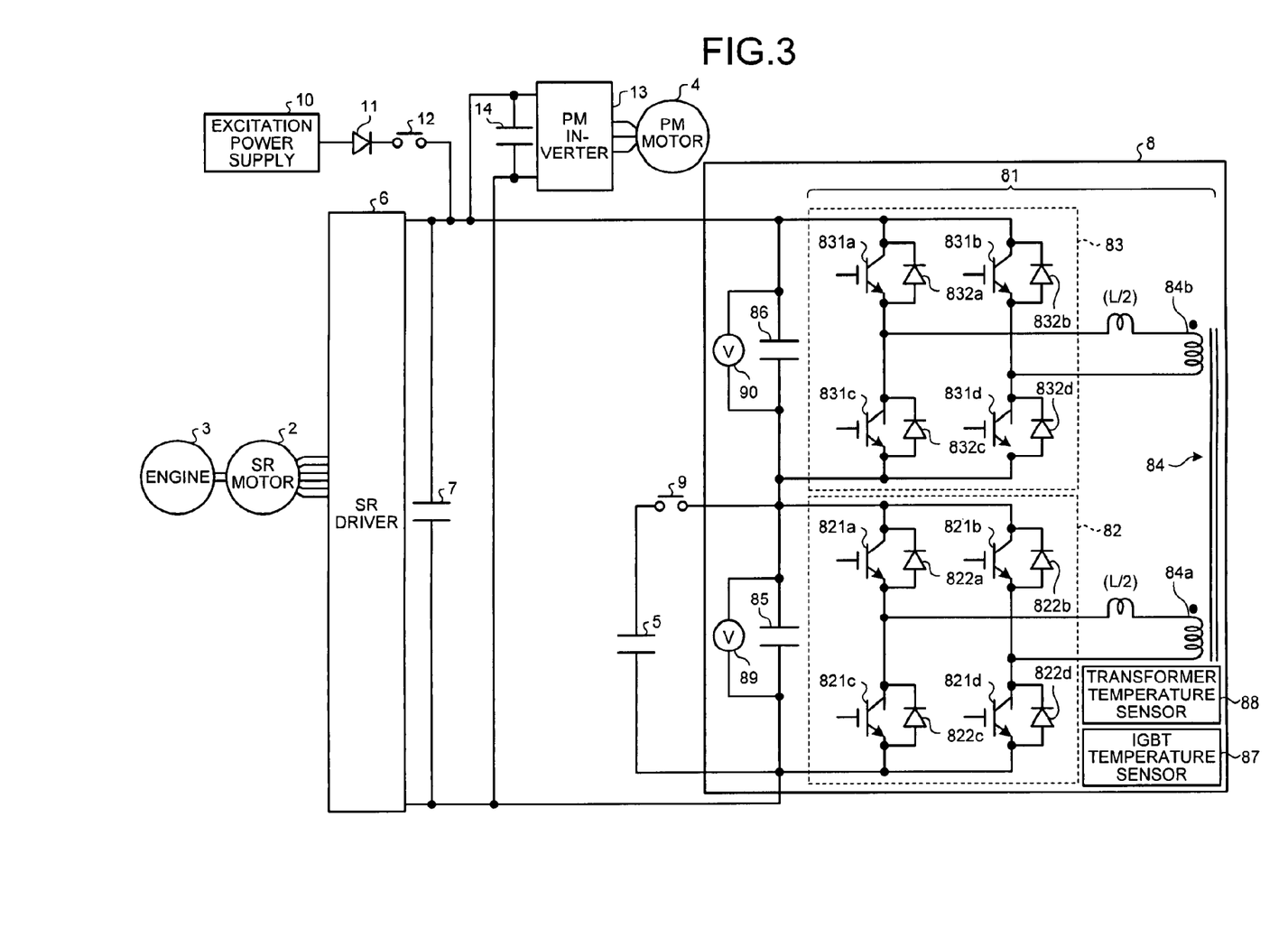
FIG. 3 is a view showing a configuration of a voltage converter.

FIG. 3 is a view showing a configuration of the voltage converter 8. The voltage converter 8 shown in the drawing is realized by using an AC-coupling bi-directional DC-DC converter 81 with additive polarity obtained by AC coupling two voltage source inverters. The AC-coupling bi-directional DC-DC converter 81 has two voltage source inverters, which are a lower inverter 82 and an upper inverter 83, and has a transformer 84 for AC-coupling alternating-current sides of the lower inverter 82 and the upper inverter 83.

The lower inverter 82 is composed of a total of four bridge-connected IGBTs (insulated gate bipolar transistors) 821a, 821b, 821c and 821d, two for each of upper and lower arms, as switching devices for switching energization. Diodes 822a, 822b, 822c and 822d for applying reflux current generated at the time of energization switching are connected in parallel to the IGBTs 821a, 821b, 821c and 821d, respectively. On the other hand, the upper inverter 83 has four IGBTs 831a, 831b, 831c and 831d as the switching devices. Diodes 832a, 832b, 832c and 832d are connected in parallel to the IGBTs 831a, 831b, 831c and 831d, respectively.

In the lower and upper inverters 82 and 83, a positive direct-current terminal of the lower inverter 82 and a negative direct-current terminal of the upper inverter 83 are connected in series so as to have additive polarity. Voltage externally applied to the AC-coupling bi-directional DC-DC converter 81 is divided by the lower inverter 82 and the upper inverter 83.

A condenser 85, mainly aimed at the surge absorption, is connected in parallel to the lower inverter 82. A capacitance of the condenser 85 is remarkably smaller than the capacitance of the capacitor 5. A low-capacitance condenser 86 for surge absorption is connected in parallel also to the upper inverter 83 as in the case of the lower inverter 82. It is preferable that the capacitance of the condenser 85 is higher than that of the condenser 86. This is because an amount of surge occurring in the condenser 85, which is on a side connected to wiring getting out of the voltage converter 8, is larger than the amount of surge occurring in the condenser 86. Also, there is an advantage of realizing a compact space because it is not necessary to make the capacitance of the condenser 86 unnecessarily high by suppressing the capacitance of the condenser 86.

The lower inverter 82 is connected to a coil 84a of the transformer 84, and the upper inverter 83 is connected to a coil 84b of the transformer 84. When rated voltages of direct-current voltages of the lower inverter 82 and the upper inverter 83 are substantially the same, it is preferable that a turn ratio between the coils 84a and 84b is set to 1:1. Therefore, the turn ratio between the coils 84a and 84b is set to 1:1 in this embodiment; however, the turn ratio may be appropriately changed.

The transformer 84 has a constant leak inductance (referred to L). In the voltage converter 8, the leak inductance is equally divided to be L/2 on a coil 84a side and L/2 on a coil 84b side. The transformer 84 transmits electric power temporarily stored in the leak inductance to the capacitor 5 or the like by high-speed switching control of the lower inverter 82 and the upper inverter 83. In general, it is known that the leak inductance increases in the transformer when a gap between a primary coil and a secondary coil gets larger. Therefore, when forming the transformer, this is often formed such that the primary coil and the secondary coil closely adhere to each other. On the other hand, in this embodiment, a desired leak inductance is willingly formed by adjusting the gap between the primary and secondary coils, that is to say, the gap between the coils 84a and 84b. Meanwhile, it is also possible to add the inductance outside the transformer 84.

The voltage converter 8 has an IGBT temperature sensor 87 for measuring a temperature of a predetermined IGBT out of the IGBTs of the lower inverter 82 and the upper inverter 83, and a transformer temperature sensor 88 for measuring a temperature of the transformer 84.

The condenser 85 of the voltage converter 8 having the above-described configuration is connected in parallel to the capacitor 5, and a contactor 9 is connected in series between the capacitor 5 and the condenser 85. When connecting the contactor 9, the voltage converter 8 increases the voltage (primary side voltage) of the capacitor 5 and supplies the increased voltage (secondary side voltage) to the SR motor 2 and the PM motor 4.

The voltage converter 8 is connected in series to an excitation power supply 10 for exciting the SR motor 2 on the secondary side. Herein, a reason for providing the excitation power supply 10 on the voltage control device 1 is described. In general, the SR motor 2 has characteristics to generate large regenerative energy when supplied with electric energy, and this does not operate as the electric generator by simple rotation drive of the rotor inside. In order to allow the SR motor 2 having such characteristics to operate as the electric generator, it is necessary to excite the coil in the SR motor 2 in advance. However, at start-up of the engine 3, an electric charge of the SR condenser 7 is 0, and it is not possible to excite the SR motor 2 by the capacitor 5 by turning on the contactor 9 at the start-up of the engine 3. Then, in this embodiment, the excitation power supply 10 is provided for exciting the SR motor 2 at the start-up of the engine 3.

A diode 11 and a relay 12 are connected in series between the voltage converter 8 and the excitation power supply 10. The diode 11 blocks the excitation power supply 10 when the voltage of the SR condenser 7 becomes larger than the voltage of the excitation power supply 10. Also, the relay 12 controls power on and power off of the excitation power supply 10 by on/off operation.

The PM motor 4 is connected to a PM inverter 13. The PM inverter 13 is connected in parallel to a PM condenser 14 composed of a film condenser. The voltage converter 8 is connected in parallel to the PM condenser 14.

A current sensor 15 is connected in series between the SR motor 2 and the SR driver 6. Also, a current sensor 16 is connected in series between the PM motor 4 and the PM inverter 13.

Voltmeters 17, 18, 19, 89 and 90, which are voltage sensors, are connected in parallel to the capacitor 5, the SR condenser 7, the PM condenser 14, and the condensers 85 and 86, respectively. An insulation sensor 20 is connected to the capacitor 5.

The voltage control device 1 is provided with a controller 21, which is controlling means. The controller 21 has a vehicle body control unit 22 for performing vehicle body control of the hydraulic shovel 100, an SR motor control unit 23 for controlling a speed and torque of the SR motor 2 by controlling the SR driver 6, a PM motor control unit 24 for controlling a speed of the PM motor 4 by controlling the PM inverter 13, a voltage converter control unit 25 for controlling the voltage converter 8, and a contactor control unit 26 for controlling on/off of the contactor 9.

Figure 4:
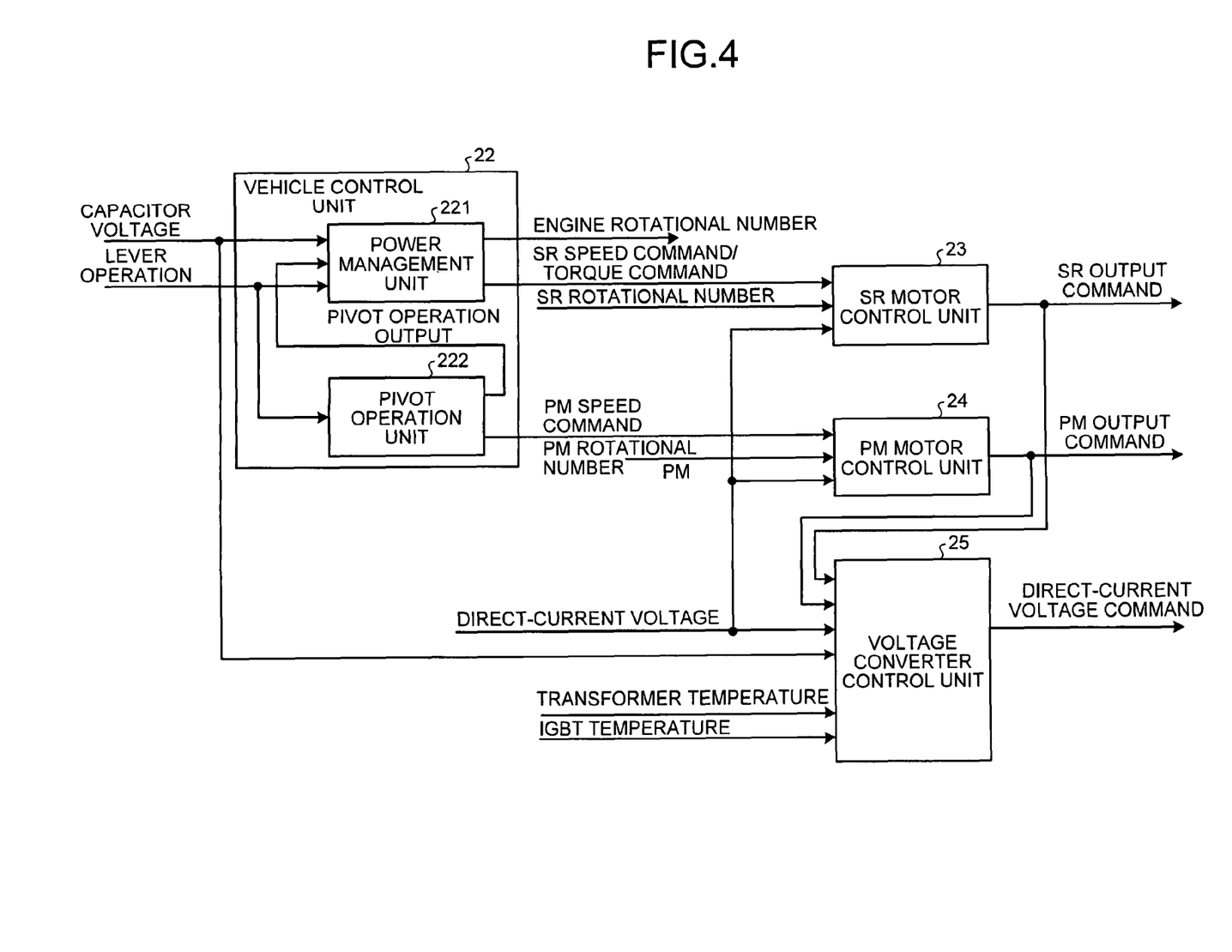
FIG. 4 is a control block diagram showing control of a controller.

FIG. 4 is a block diagram showing control of the controller 21. The vehicle body control unit 22 of the controller 21 has a power management unit 221 for generating operation commands of the engine 3 and the SR motor 2, and a pivot operation unit 222 for generating an operation command of the PM motor 4, and performs the vehicle body control based on the voltage of the capacitor 5 and operation of an operation lever Lv by an operator. The power management unit 221 generates an engine rotational number command corresponding to the voltage of the capacitor 5, an operating state of the operation lever Lv and a pivot operating state transmitted from the pivot operation unit 222 to output to the engine 3, on the other hand, this generates a speed command and a torque command of the SR motor 2 to output to the SR motor control unit 23. Also, the pivot operation unit 222 generates a speed command of the PM motor 4 corresponding to the voltage of the capacitor 5 and the lever operating state to output to the PM motor control unit 24.

The SR motor control unit 23 generates the operation command of the SR motor 2 by using the speed command and the torque command output from the vehicle body control unit 22, the rotational number of the SR motor 2, and the direct-current voltage output by the voltage converter 8 to output to the SR driver 6.

The PM motor control unit 24 generates the operation command of the PM motor 4 by using the speed command of the PM motor 4 output from the vehicle body control unit 22, the rotational number of the PM motor 4, and the direct-current voltage output by the voltage converter 8 to output to the PM inverter 13.

The voltage converter control unit 25 generates a direct-current voltage command based on the direct-current voltage output by the voltage converter 8, the operation command of the SR motor 2 output by the SR motor control unit 23, the operation command of the PM motor 4 output by the PM motor control unit 24, and the transformer temperature and the IGBT temperature in the voltage converter 8 to output to the voltage converter 8.

Figure 5:
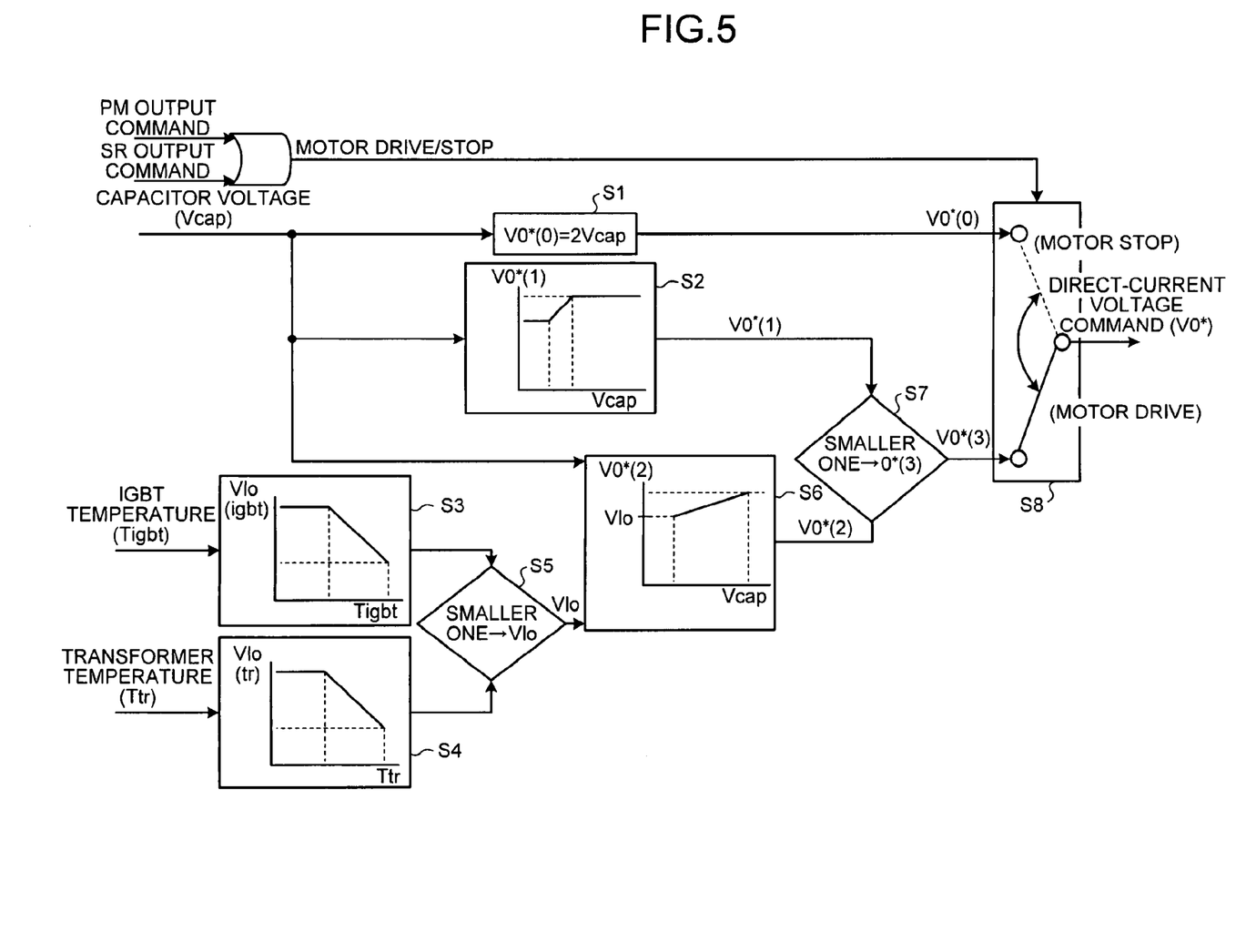
FIG. 5 is a calculation flow of a direct-current voltage command output by a voltage converter control unit.

FIG. 5 is a calculation flow of the direct-current voltage command output by the voltage converter control unit 25. The voltage converter control unit 25 generates a direct-current voltage command V0* based on the SR motor operation command output from the SR motor control unit 23 and the PM motor operation command output from the PM motor control unit 24.

In the following description, it is set that the rated voltage of the SR motor 2 and the PM motor 4 is 550(V). Also, it is set that the capacitance of the capacitor 5 is selected such that a fluctuation range of a capacitor voltage Vcap is 150 to 300(V) at normal operation. Meanwhile, the fluctuation range of the capacitor voltage Vcap and numerical values indicated below are no more than one example, and this embodiment is not limited by the numerical values.

First, the voltage converter control unit 25 calculates an amount twice the obtained capacitor voltage Vcap (2Vcap) as a first candidate value V0*(0) of the direct-current voltage command (step S1). The first candidate value V0*(0)=2Vcap is the voltage at which device gross loss of the AC-coupling bi-directional DC-DC converter 81 is the minimum in an unloaded state, that is to say, the voltage at which efficiency of the AC-coupling bi-directional DC-DC converter is the maximum in the unloaded state. Herein, the "device gross loss" includes conduction loss of each IGBT and resistance (including direct-current resistance, a skin effect, alternating-current resistance such as eddy current loss) of the transformer 84, and this is proportional to a volume of current flowing through the transformer 84.

Figure 6:
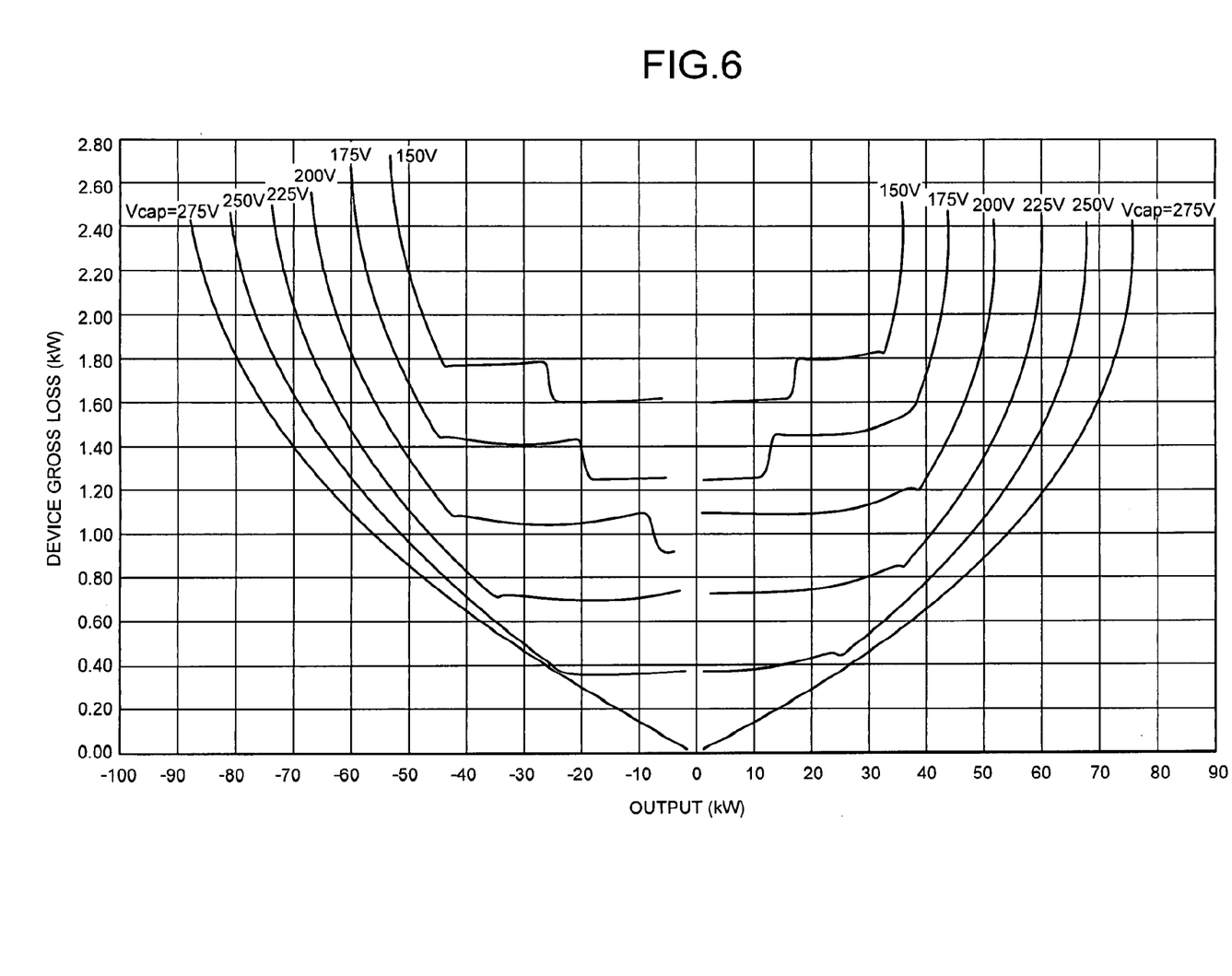
FIG. 6 is a view showing relationship between an output of the voltage converter and device gross loss corresponding to capacitor voltage in a case in which an AC-coupling bi-directional DC-DC converter is applied as the voltage converter.

FIG. 6 is a view showing relationship between an output V0 of the voltage converter 8 and the device gross loss corresponding to the capacitor voltage Vcap, in a case in which the above-described AC-coupling bi-directional DC-DC converter is applied as the voltage converter 8 and rated power of the SR motor 2 and the PM motor 4 is 550(V). In FIG. 6, when comparing in the same output, it is found that the device gross loss is the minimum when the capacitor voltage Vcap is 275(=550/2)(V). This is because the current flowing through the transformer 84 is smaller and the device gross loss is smaller when the direct-current voltage Vo satisfies V0=2Vcap than in a case of V0≠2Vcap (when the electric power is not exchanged between the SR motor 2 and the capacitor 5, the current flowing through the transformer 84 is ideally 0). Meanwhile, since the turn ratio between the coils 84a and 84b of the transformer 84 is set to 1:1 in this embodiment, the efficiency of the AC-coupling bi-directional DC-DC converter 81 is the maximum when V0*=2Vcap is satisfied; however, in a case of more general turn ratio, the voltage V0* at which the loss of the AC-coupling bi-directional DC-DC converter 81 is the minimum is proportional to the capacitor voltage Vcap, and a proportionality coefficient thereof is determined according to the turn ratio.

The voltage converter control unit 25 also performs calculation other than the above-described step S1 by using the obtained capacitor voltage Vcap. Specifically, the voltage converter control unit 25 obtains two supplementary candidate values V0*(1) and V0*(2) for determining a candidate value of output voltage by using two different calculation methods, and thereafter, outputs the minimum value of them as V0*(3).

Figure 7:
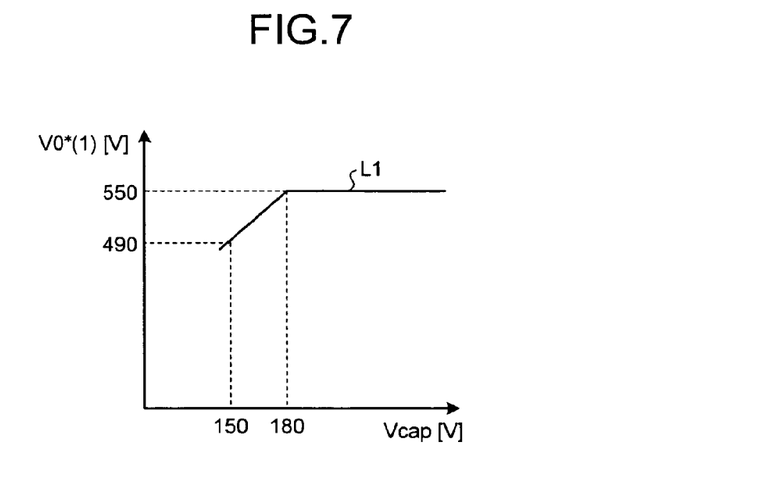
FIG. 7 is a view showing relationship between capacitor voltage and a candidate value (first supplementary candidate value) of output voltage.

First, a first calculation method is described. The voltage converter control unit 25 calculates a first supplementary candidate value V0*(1) for determining the direct-current voltage command according to the value of the capacitor voltage Vcap (step S2). FIG. 7 is a view showing relationship between the capacitor voltage Vcap and the first supplementary candidate value V0*(1), which is referred to in this calculation. A curve L1 shown in the drawing takes the rated voltage 550(V) as the first supplementary candidate value V0*(1) when Vcap is not less than 180(V); however the first supplementary candidate value V0*(1) gradually decreases when Vcap is less than 180(V).

Figure 8:
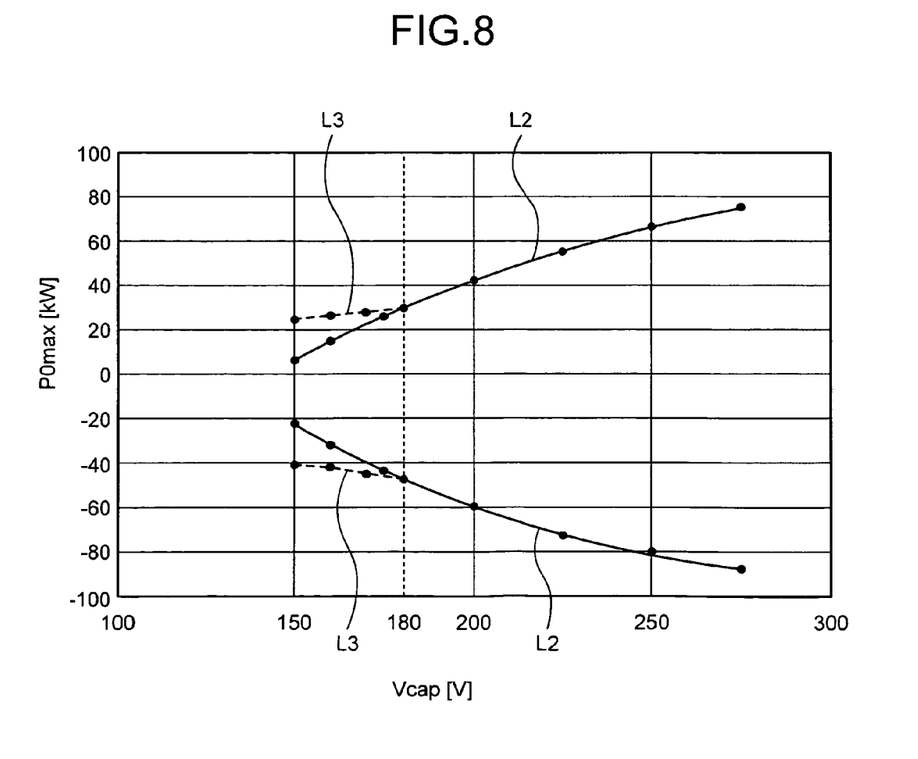
FIG. 8 is a view showing relationship between the capacitor voltage and a maximum output of the voltage converter.

FIG. 8 is a view showing relationship between the capacitor voltage Vcap and a maximum output P0max of the voltage converter 8. A curve L2 shown in the drawing (indicated by a solid line) represents the relationship between the capacitor voltage Vcap and the maximum output P0max of the voltage converter 8 when the first supplementary candidate value V0*(1) is constantly set to 550(V) without depending on the capacitor voltage Vcap. On the curve L2, the maximum output P0max gradually decreases with decrease in the capacitor voltage Vcap.

On the other hand, a curve L3 (indicated by a broken line) in FIG. 8 is the curve representing the relationship between the capacitor voltage Vcap and the maximum output P0max of the voltage converter 8 when the first supplementary candidate value V0*(1) is changed as represented by the curve L1 shown in FIG. 7 in a range of Vcap≦180(V). Meanwhile, the curve L3 conforms to the curve L2 in a range of Vcap≧180 (V). As is clear from FIG. 8, on the curve L3, the decrease in the maximum output P0max is suppressed than in a case of the curve L2 in the range of Vcap≦180(V). Therefore, it becomes possible to obtain a certain volume as the maximum output P0max even when the capacitor voltage Vcap has a voltage value near the minimum value in the voltage fluctuation range at the normal operation (150 to 300(V)).

In the voltage control device 1, when the capacitor voltage Vcap decreases at high-load operation or the like, an internal temperature of the voltage converter 8 increases. Then, in this embodiment, it is configured to generate the voltage command for protecting the lower inverter 82 and the upper inverter 83 and reducing the load, by suppressing the output voltage of the voltage converter 8. In this manner, by placing maximum priority on efficiency of the voltage converter 8 in the range in which the capacitor voltage Vcap is low, as a result, it becomes possible to improve efficiency of a voltage control device 1 as a whole.

In FIG. 8, a value obtained by processing an actual measured value using an approximately 100 (msec) filter is used as the capacitor voltage Vcap. This is for preventing oscillation of voltage control, due to large fluctuation in the direct-current voltage V0 output by the AC-coupling bi-directional DC-DC converter 81 in a case of rapid fluctuation of the capacitor voltage Vcap.

Meanwhile, the relationship between the capacitor voltage Vcap and the maximum output P0max shown in FIG. 8 is no more than one example, and this differs according to conditions such as behavior of the load of the voltage control device 1 and the rated voltages of the SR motor 2 and the PM motor 4.

Subsequently, a second calculation method is described (steps S3 to S4). The voltage converter control unit 25 calculates a second supplementary candidate value V0*(2) for determining the direct-current voltage command based on the internal temperature of the voltage converter 8 and the capacitor voltage Vcap. In this embodiment, the IGBT temperature sensor 87 and the transformer temperature sensor 88 measure a temperature Tigbt of a predetermined IGBT and a temperature Ttr of the transformer 84, respectively, as the internal temperature of the voltage converter 8. Meanwhile, the temperatures of the IGBT and the transformer 84 are measured by attaching the temperature sensors to appropriate positions.

Figure 9:
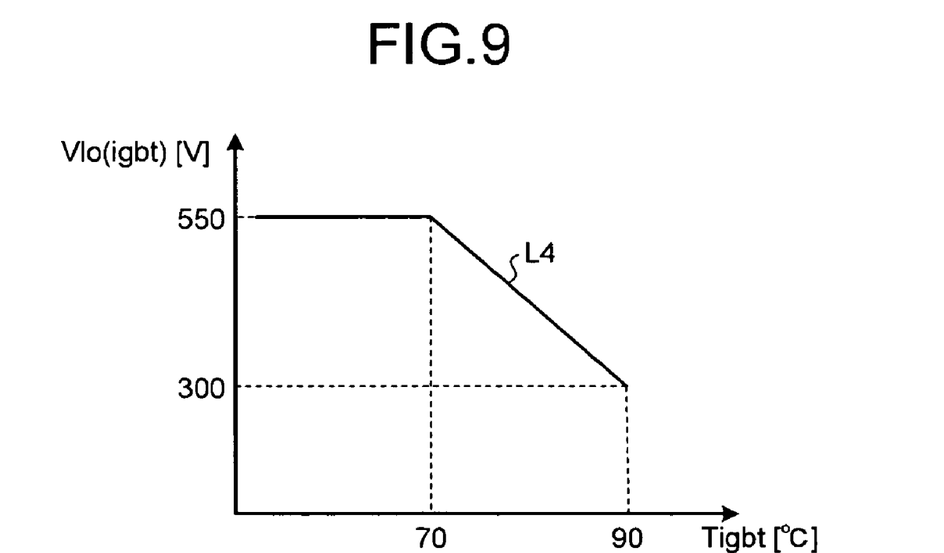
FIG. 9 is a view showing relationship between an IGBT temperature and a minimum value of the output voltage.

At a step S3, the voltage converter control unit 25 calculates a minimum value Vlo(igbt) of the output voltage corresponding to the obtained IGBT temperature Tigbt (step S3). FIG. 9 is a view showing relationship between the IGBT temperature Tigbt and the minimum value Vlo(igbt) of the output voltage, which the voltage converter control unit 25 refers to. On a curve L4 shown in the drawing, the minimum value Vlo(igbt) is 550(V), which is motor rated voltage, when the IGBT temperature Tigbt is not higher than 70(° C.); however, the minimum value Vlo(igbt) starts decreasing when the IGBT temperature Tigbt is higher than 70(° C.), and is the minimum value 300(V) when the IGBT temperature is 90° C. Meanwhile, the relationship between the IGBT temperature Tigbt and the minimum value Vlo(igbt) of the output voltage is determined according to conditions such as rating of the IGBT device as the relationship capable of preventing breakdown of the IGBT device due to overheat, and the curve L4 shown in FIG. 9 is no more than one example.

Figure 10:
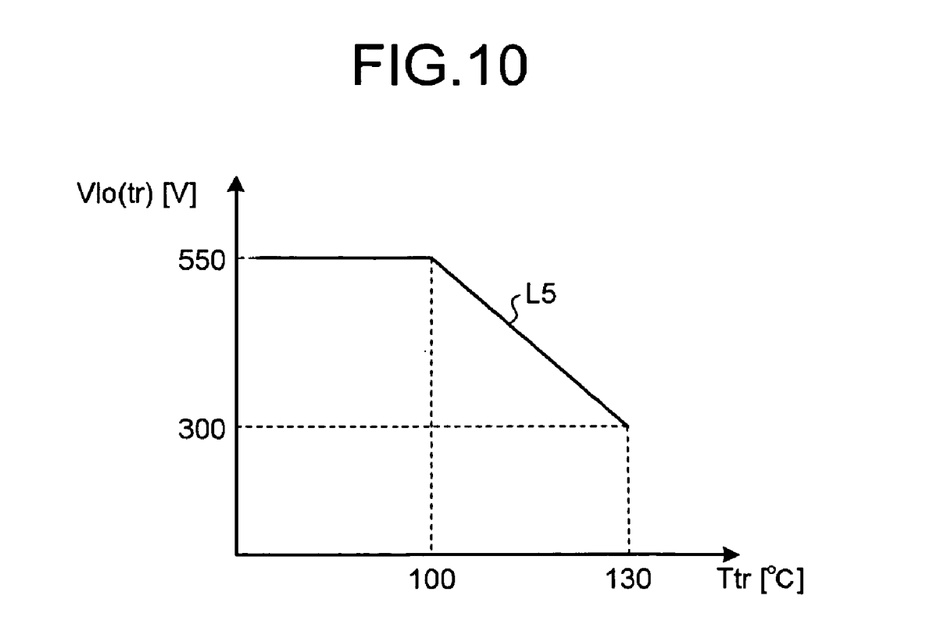
FIG. 10 is a view showing relationship between a transformer temperature and the minimum value of the output voltage.

The voltage converter control unit 25 also calculates a minimum value Vlo(tr) of the output voltage corresponding to the obtained transformer temperature Ttr (step S4). FIG. 10 is a view showing relationship between the transformer temperature Ttr and the minimum value Vlo(tr) of the output voltage, which the voltage converter control unit 25 refers to. On a curve L5 shown in the drawing, when the transformer temperature Ttr is not higher than 100(° C.), the minimum value Vlo(tr) is 550(V), which is the motor rated voltage; however, when the transformer temperature Ttr is higher than 100(° C.), the minimum value Vlo(tr) starts decreasing and is the minimum value 300(V) when the transformer temperature is 130(° C.). Meanwhile, the relationship between the transformer temperature Ttr and the minimum value Vlo(tr) of the output voltage is determined according to conditions such as an insulation class of winding of the transformer 84 as the relationship capable of preventing insulation breakdown of the transformer 84 due to overheat, and the curve L5 shown in FIG. 10 is no more than one example.

Subsequently, the voltage converter control unit 25 sets the minimum value out of Vlo(igbt) and Vlo(tr) obtained at the steps S3 and S4, respectively, as Vlo (step S5).

Meanwhile, although a case in which the IGBT temperature Tigbt and the transformer temperature Ttr are used as the internal temperature of the voltage converter 8 is described in this embodiment, it is also possible to obtain Vlo using one of the temperatures.

Figure 11:
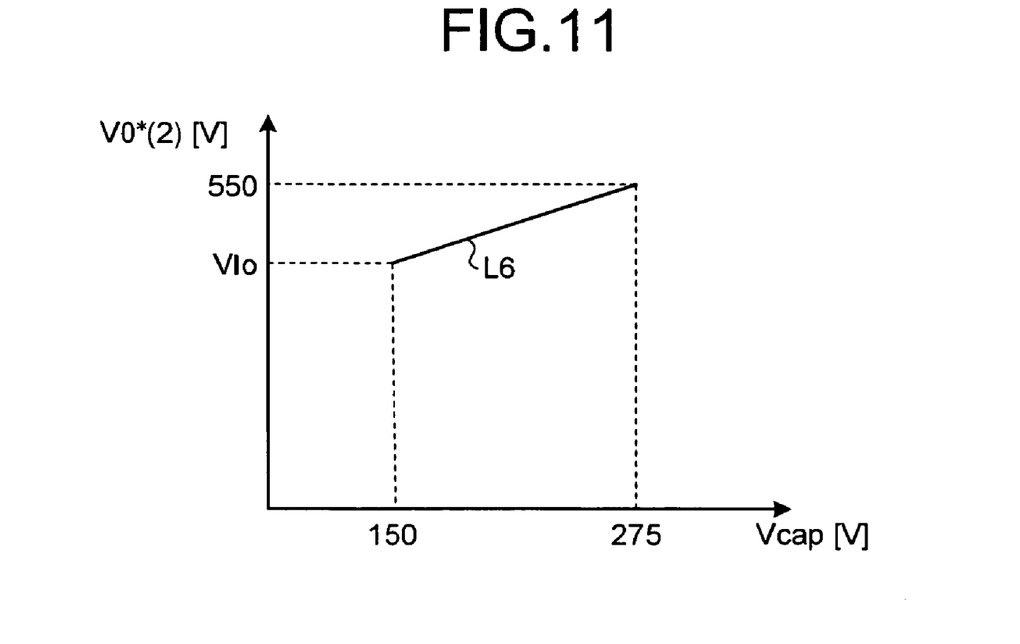
FIG. 11 is a view showing the relationship between the capacitor voltage and the candidate value (second supplementary candidate value) of the output voltage.

Thereafter, the voltage converter control unit 25 calculates the second supplementary candidate value V0*(2) using the minimum value Vlo set at the step S5 (step S6). FIG. 11 is a view showing relationship between the capacitor voltage Vcap and the second supplementary candidate value V0*(2), which the voltage converter control unit 25 refers to. On a straight line L6 shown in the drawing, V0*(2)=Vlo when the capacitor voltage Vcap is 150(V). Also, the second supplementary candidate value V0*(2) linearly increases as the capacitor voltage Vcap increases and is the maximum value 550(V) when Vcap=275(V). Especially, when Vlo=300(V), the straight line L6 satisfies V0*(2)=2Vcap. In general, Vlo≧300(V), so that the straight line L6 always satisfies V0*(2)≧2Vcap.

The voltage converter control unit 25 compares the first supplementary candidate value V0*(1) obtained at the step S2 with the second supplementary candidate value V0*(2) obtained at the step S6 and determines the smaller one as a second candidate value V0*(3) of the direct-current voltage command of the output voltage (step S7).

The voltage converter control unit 25 selects one of the first candidate value V0*(0) and the second candidate value V0*(3) according to drive conditions of the SR motor 2 and the PM motor 4, and outputs the selected candidate value to the voltage converter 8 as the direct-current voltage command V0* (step S8). Specifically, the voltage converter control unit 25 sets the first candidate value V0*(0) as the direct-current voltage command V0* when the SR motor 2 and the PM motor 4 stop and in the unloaded state, on the other hand, this sets the second candidate value V0*(3) as the direct-current voltage command V0* when at least one of the SR motor 2 and the PM motor 4 drives. FIG. 5 shows a case in which at least one of the SR motor 2 and the PM motor 4 drives and the second candidate value V0*(3) is selected as the direct-current voltage command V0*.

For example, it is known that the larger the primary side voltage (corresponding to the capacitor voltage Vcap), the better the efficiency of the voltage converter, in a case of the conventional voltage converter such as a chopper-type DC-DC converter. Also, in the conventional voltage converter, change in efficiency of the voltage converter corresponding to the change in the primary side voltage has not been as large as that of the AC-coupling bi-directional DC-DC converter. Therefore, there has been a limit in improving the efficiency even when it is tried to control the efficiency of the voltage converter. On the other hand, the efficiency of the AC-coupling bi-directional DC-DC converter 81, which is applied in this embodiment, largely changes according to the change in the primary side voltage, so that efficiency of the system may be remarkably improved by performing the control to set an optimal value.

According to the above-described one embodiment of the present invention, the AC-coupling bi-directional DC-DC converter for increasing the capacitor voltage to output to the inverter is provided between the capacitor, which is a storage battery, and the inverter, and the control to determine the direct-current voltage based on the efficiency of the AC-coupling bi-directional DC-DC converter having a value corresponding to the capacitor voltage is performed, so that it is possible to determine the direct-current voltage such that the efficiency of the AC-coupling bi-directional DC-DC converter is the best even when the high-capacitance capacitor is used as the storage battery on a load side. Therefore, even when the load connected to the inverter is large and the fluctuation in the capacitor voltage is large, efficiency of the system as a whole may be improved.

Also, according to this embodiment, the loss of the voltage converter itself is small, so that it is possible to suppress the increase in temperature in the voltage converter and prevent the breakdown of the IGBT device and the insulation breakdown of the transformer due to the increase in the temperature, thereby protecting components inside. Therefore, it becomes possible to realize smooth continuous operation of the system without breakdown of the electric power exchange by the voltage converter.

Further, according to this embodiment, it is possible to decrease the loss and improve the fuel consumption by using an operation range with better efficiency of the voltage converter according to the capacitor voltage.

Alternative Embodiment

Figure 12:
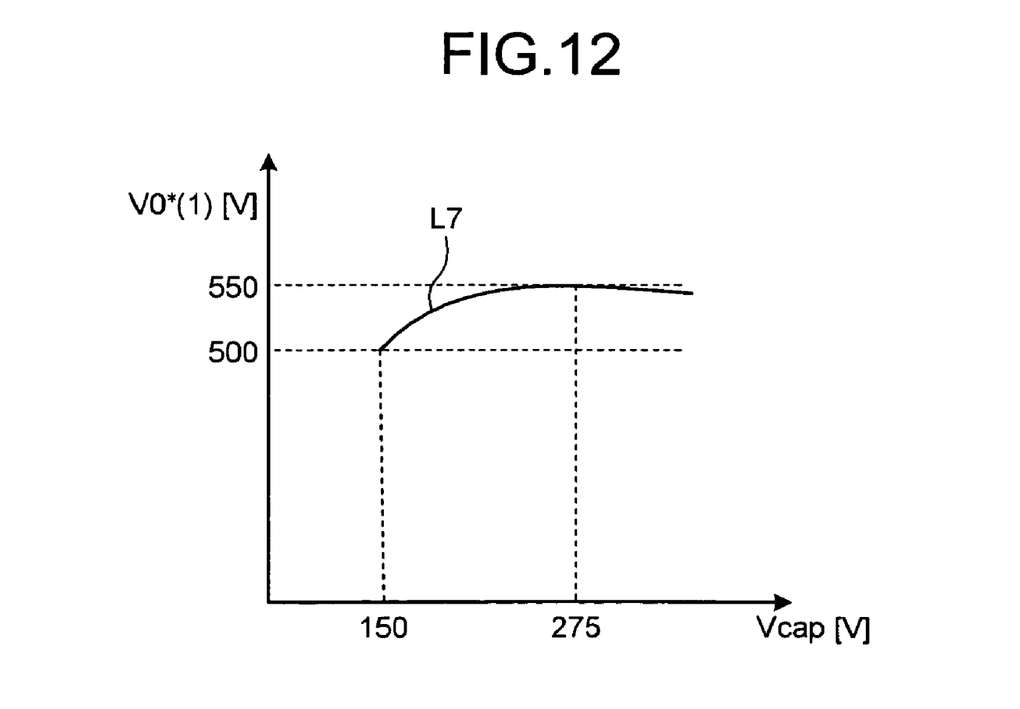
FIG. 12 is a view showing a second example of the relationship between the capacitor voltage and the candidate value (first supplementary candidate value) of the output voltage.

In the voltage control method according to this embodiment, the relationship between the capacitor voltage Vcap and the first supplementary candidate value V0*(1), which the voltage converter control unit 25 refers to at the step S2, is not limited to the curve L1 shown in FIG. 7. FIG. 12 is a view showing the relationship between the capacitor voltage Vcap and the first supplementary candidate value V0*(1), which is referred to at the step S2. A curve L7 shown in FIG. 12 is set such that the first supplementary candidate value V0*(1) changes within a predetermined range (500 to 550(V) in FIG. 12) according to the capacitor voltage Vcap. The range is determined based on the motor rated voltage, and is set such that the efficiency of the voltage converter 8 is substantially constant or the efficiency of the voltage converter 8 is better according to the change in the capacitor voltage Vcap.

Figure 13:
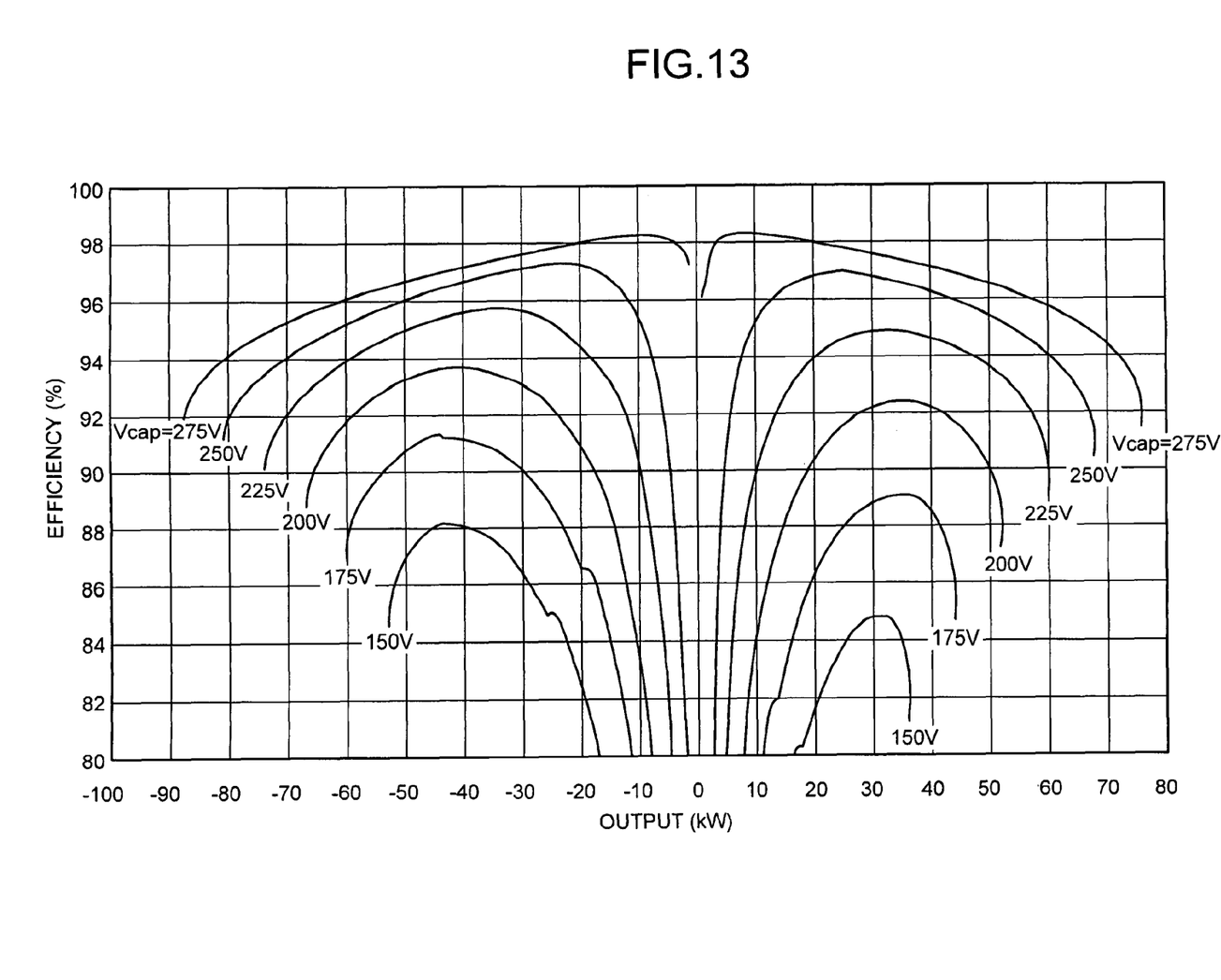
FIG. 13 is a view showing relationship between the output and efficiency of the voltage converter corresponding to the capacitor voltage when the output voltage is 550(V).

Hereinafter, one example of a method of setting the curve L7 is described. FIG. 13 is a view showing relationship between the output and the efficiency of the voltage converter 8 when the output voltage V0* is 550(V). The efficiency of the voltage converter 8 is the best when the output voltage V0* is twice the capacitor voltage, as described above. Therefore, when setting the first supplementary candidate value V0*(1) in the range of 500 to 550(V), it is regarded that the relationship between an optional capacitor voltage Vcap and the output voltage V0* is substantially similar to the relationship shown in FIG. 13. For example, when V0*=500(V), the curve of 275(V) shown in FIG. 13 is regarded as a line of Vcap=V0*/2=250(V). Also, when V0*=520(V), a curve of 275(V) shown in FIG. 13 is regarded as a line of Vcap=V0*/2=260(V).

In this manner, by making all of the relationships between the output and the efficiency of the voltage converter 8 in a case in which the output voltage V0* is within the range of 500 to 550(V) and by making the curve on which the efficiency of the voltage converter 8 is substantially constant according to the change in the capacitor voltage Vcap (150 to 300(V)) or the efficiency of the voltage converter 8 is always excellent for the fluctuation in the voltage, according to a predetermined regulation, the curve L7 is obtained.

Although the best mode for carrying out the present invention is described in detail heretofore, the present invention should not be limited by the above-described one embodiment. For example, in the present invention, the motor coupled to the engine may be the motor other than the SR motor, and may be, for example, the PM motor. In this case, the excitation power supply is not necessary.

Also, the present invention is of course applicable to construction machines other than the hydraulic shovel, and is applicable to the various types of hybrid vehicles other than the construction machines.

In addition, in the present invention, the load connected to the voltage converter may be other than the motor.

In this manner, the present invention may include various embodiments not described herein, and various design changes may be made within the scope of the technical idea specified by claim.

INDUSTRIAL APPLICABILITY

As described above, the present invention is useful in the hybrid vehicle having the engine and the motor of which drive shafts are coupled to each other as drive sources, and is especially suitable for the hybrid construction machines of which load fluctuation is large.

The invention claimed is:

1. A voltage control device, comprising:
    a capacitor for supplying electric power to a predetermined load;
    an inverter connected to the load;
    an AC-coupling bi-directional DC-DC converter including two voltage source inverters of which direct-current terminals are connected in series to each other so as to have additive polarity and a transformer for AC-coupling alternating-current terminals of the two voltage source inverters and having a predetermined leak inductance, with one of the two voltage source inverters connected in parallel to the capacitor, for outputting direct-current voltage obtained by increasing capacitor voltage of the capacitor to the inverter; and
    a control unit for generating a command value to output under a load operation by using a direct-current voltage value based on efficiency of the AC-coupling bi-directional DC-DC converter corresponding to the capacitor voltage, wherein
    when generating the command value of the direct-current voltage under the load operation, the control unit sets the direct-current voltage value as a first supplementary candidate value, while the control unit sets the direct-current voltage value determined so as to correspond to an internal temperature of the AC-coupling bi-directional DC-DC converter as a second supplementary candidate value, and
    the control unit sets a smaller one of the first and second supplementary candidate values as the command value of the direct-current voltage under the load operation.

2. The voltage control device according to claim 1, wherein the control unit sets the direct-current voltage value constant without depending on the capacitor voltage when the capacitor voltage takes a value within a predetermined range, and sets the direct-current voltage value to a value with which the efficiency of the AC-coupling bi-directional DC-DC converter is better than that with the constant value when the capacitor voltage takes a value outside the range.

3. The voltage control device according to claim 1, wherein the control unit changes the direct-current voltage value within a predetermined range according to the capacitor voltage.

4. The voltage control device according to claim 1, wherein the voltage source inverter has a plurality of switching devices, and
the internal temperature of the AC-coupling bi-directional DC-DC converter is a temperature of any of the plurality of switching devices and/or a temperature of the transformer.

5. The voltage control device according to claim 1, wherein the control unit sets the command value in an unloaded state to voltage in proportion to the capacitor voltage.

6. The voltage control device according to claim 5, wherein the load is a motor.

7. A voltage control method of a system provided with a capacitor for supplying electric power to a predetermined load, an inverter connected to the load, and an AC-coupling bi-directional DC-DC converter including two voltage source inverters of which direct-current terminals are connected in series to each other so as to have additive polarity and a transformer for AC-coupling alternating-current terminals of the two voltage source inverters and having a predetermined leak inductance, with one of the two voltage source inverters connected in parallel to the capacitor, for outputting direct-current voltage obtained by increasing capacitor voltage of the capacitor to the inverter, the voltage control method comprising:
generating a command value to output under a load operation by using a direct-current voltage value based on efficiency of the AC-coupling bi-directional DC-DC converter corresponding to the capacitor voltage,
when generating the command value of the direct-current voltage under the load operation, setting the direct-current voltage value as a first supplementary candidate value, while setting the direct-current voltage value determined so as to correspond to an internal temperature of the AC-coupling bi-directional DC-DC converter as a second supplementary candidate value; and
setting a smaller one of the first and second supplementary candidate values as the command value of the direct-current voltage under the load operation.

8. The voltage control method according to claim 7 further comprising:
setting the direct-current voltage value constant without depending on the capacitor voltage when the capacitor voltage takes a value within a predetermined range, and
setting the direct-current voltage value to a value with which the efficiency of the AC-coupling bi-directional DC-DC converter is better than that with the constant value when the capacitor voltage takes a value outside the range.

9. The voltage control method according to claim 7 further comprising: changing the direct-current voltage value within a predetermined range according to the capacitor voltage.

* * * * *